US006343757B1

(12) United States Patent
Zwettler

(10) Patent No.: US 6,343,757 B1
(45) Date of Patent: Feb. 5, 2002

(54) ELONGATED CLEARANCE-TYPE GUIDE FOR MAGNETIC TAPE

(75) Inventor: Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/539,255

(22) Filed: Mar. 30, 2000

(51) Int. Cl.[7] .............................................. G11B 23/04

(52) U.S. Cl. ...................................... 242/346; 360/132

(58) Field of Search ................................. 242/346, 341; 360/132, 130.21

(56) References Cited

U.S. PATENT DOCUMENTS

| 1,839,064 A | * | 12/1931 | Thornton ..................... 242/346 |
| 2,560,564 A | * | 7/1951 | Foster et al. ................. 242/346 |
| 5,513,815 A | * | 5/1996 | Erickson et al. ............ 242/346 |
| 5,870,924 A | | 2/1999 | Fahimi et al. |
| 5,893,526 A | | 4/1999 | Zwettler |

* cited by examiner

Primary Examiner—Emmanuel M. Marcelo
(74) Attorney, Agent, or Firm—Eric D. Levinson

(57) ABSTRACT

A clearance-type tape guide for guiding a recording tape along a tape path having two tape reels. The tape slidably engages the tape guide along a surface having a length L1. The tape travels along the tape path for a distance L2 between the tape guide surface and the closer of the tape reels. According to the invention, L1 ≧ 0.3 L2.

16 Claims, 5 Drawing Sheets

ELONGATED CLEARANCE-TYPE GUIDE FOR MAGNETIC TAPE

TECHNICAL FIELD

This invention relates to guiding magnetic storage tape along a tape path.

BACKGROUND ART

Tape cartridges for tape carrying digital data on a number of tracks across a magnetic tape are well known. There are generally three types of such data storage cartridges. Single reel cartridges comprise a spool of tape which is provided to a user along with a leader block positioned at one end thereof. In operation, the user places the spool in a drive mechanism which functions to thread the tape for receipt by another reel. The tape is transported between the two reels and data is read and/or written. The drive mechanism is responsible for providing guiding of the tape as it passes by a head such as, for example, a transducer. The drive mechanism also functions to provide tape tension by, for example, servoing the reels as they change their diameters during the read/write process.

Dual reel data cartridges, also called "hub-driven" cartridges, include two or more spools or "hubs" integral to the cartridge. Placement of the hubs within the cartridge itself obviates the time and effort required for tape threading and, therefore, permits significantly faster access over conventional single reel cartridges. The internal placement of the hubs further permits the use of an external protective covering or shell which functions to protect the hubs and the tape from contaminants during both storage and use. In operation, respective drive motors engage the spools. In further contrast to the aforementioned single reel cartridges, dual reel data cartridges also include tape guiding means for guiding the tape past the head or transducer. Typically, the guiding means comprises one or more rigid flanges such as fixed guides or pins. See, for example, U.S. Pat. No. 5,870,924 to Fahimi et. al., which discloses a tape bearing surface usable as a front guide assembly.

Belt-driven data cartridges, like dual reel cartridges, incorporate the tape within the cartridge itself and include two or more spools or hubs. Unlike dual reel cartridges, belt-driven data cartridges further include an elastic drive belt operative to engage the tape at the respective tape-spool peripheries and provide tape tension. More specifically, tape cartridges of this type include a cartridge shell that defines an enclosure, and a pair of tape reels supported within the enclosure. A length of magnetic tape extends along a tape path within the enclosure. Each end of the tape is wound onto one of the reels. Like dual reel cartridges, the tape moves past suitable guides or flanges and across an opening in an edge of the cartridge into which a read/write head or transducer protrudes to tension the tape and write or read data when the cartridge is inserted into a recording/reproducing machine.

Regardless of the type of data cartridge used, the process for reading and writing data remains substantially the same. That is, data is written across all or substantially all of each respective track. Data is read, however, from only a portion of each track. In this manner, allowances can be made for read errors resulting from shifts in the magnetic tape. As those skilled in the art will recognize, such shifts, called track misregistrations (TMRs) may be caused by numerous events such as, for example, slamming of a tape edge against a fixed flange (reference edge), tolerance differentials between one or more tape guides and the data cartridge substrate, etc. Any one or more of these events may result in an off-track event.

In prior art data cartridges where tracks were written linearly on magnetic tapes, a small number of relatively wide data tracks (10 or less) were used. Conventional methods for tape edge guiding were, therefore, generally sufficient. As long as the tape was maintained within a predetermined critical area, data could be written and read consistently.

Advances in tape manufacture, coupled with the desire to read and write more information on individual cartridges, however, has altered the control scenario dramatically. Presently, data cartridges have substantially more data tracks (100 or more), each of which is substantially narrower (micrometers in width) than prior art linear written tracks. As a result, much tighter control is necessary to prevent off-track events.

To ensure that the cartridge tapes are properly positioned so that each of the very narrow individual tracks having data are appropriately positioned as they cross the read/write head, it is necessary that the tapes be guided precisely along their paths of travel. Closed loop systems have, therefore, been used for positioning data cartridge tapes. Such servo systems incorporate servo tracks written on the magnetic tapes which are followed by a tracking head. The servo tracking head operates to control the position of the head or transducer to ensure that it is properly aligned with the tape. As TMRs cause the tape to move, the servo tracking head moves in step thus maintaining the head within the critical read area of the tape.

Although servo systems have greatly addressed the problems associated with off-track events, they have created new control problems of their own. As indicated above, such servo systems function to sense and address TMRs by following movement of written servo tracks on the magnetic tapes. Conventional read/write heads, however, have limited bandwidth. Therefore, they are not capable of following very fast motions such as those which result from reflections ("slamming") of the magnetic tape off of a fixed tape guide. As a result, "servo off track" events occur wherein the servo system is unable to properly align the head with the tape. As a result, the head must back up and again attempt to perform the read or write function. This servo transient event is undesirable as it results in unnecessary use of system resources and increases the time required for the read/write process.

To address this issue, spring-loaded pads have been proposed for use as bottom flanges on each of the front guide assemblies. These flanges are typically comprised of thin foils which apply a light load (approximately 2 grams nominal per pad or 4 grams edge force) as the tape runs between the front guide assembly. These types of guide assemblies are known as "compliant guides."

A dual reel data cartridge incorporating compliant guides is shown in FIG. 1 and designated generally by reference numeral 10. Cartridge 10 defines an enclosure, not shown, in which a pair of reels 12 and 14 are supported for free rotation about substantially parallel axis. A length of magnetic tape 16 is moved along a tape path established by front guides 18 and 20. The opposite ends of guide 18 are connected to reels 12 and 14. Guides 18 and 20 each include pads 22 which, as indicated above, are thin foils which function to apply a light load on the bottom edge of tape 16 in order to register it against the respective top flanges 24 and 26 of guides 18 and 20.

It has been found, however, that while these "compliant guides" address the issue of keeping the tape registered against one edge (flanges 24 and 26), the tape is nonetheless sensitive to off-track events originating at the tape hubs 12 and 14. Moreover, the edge force required to address steering effects resulting from tolerance differentials between the hubs 12 and 14 and the base plate 28 may result in undesirable wear on the tape edge, particularly, top edge 30.

SUMMARY OF THE INVENTION

The present invention provides a data storage cartridge having an improved tape guide which overcomes the above-noted problems of durability and servo off-track events.

The present invention relates to a clearance-type tape guide for guiding a length of magnetic tape along a tape path including at least one tape reel. The tape guide has a vertical surface for slidably engaging the tape. The length of the surface of the guide that engages the tape is defined as L1. The length of the tape path from the nearest engagement surface of the tape guide to the at least one tape reel is defined as L2. According to the invention, $L1 \geq 0.3\ L2$. In other embodiments of the invention, the ratio of L1 to L2 preferably is $L1 \geq 0.5\ L2$, more preferably $L1 \geq 0.7\ L2$, and in certain circumstances, $L1 > L2$.

The tape guide may also include a central portion for receiving a drive transducer. The guide may be formed by bending a single, flat sheet of material. Alternatively, the tape guide may be made from multiple pieces.

The present invention also includes a data storage cartridge having a cartridge housing and a pair of tape reels mounted in the housing. The recording tape is wound on the reels and extends between them along a tape path. The cartridge also has a tape guide as described above.

DETAILED DESCRIPTION

Figure 1:
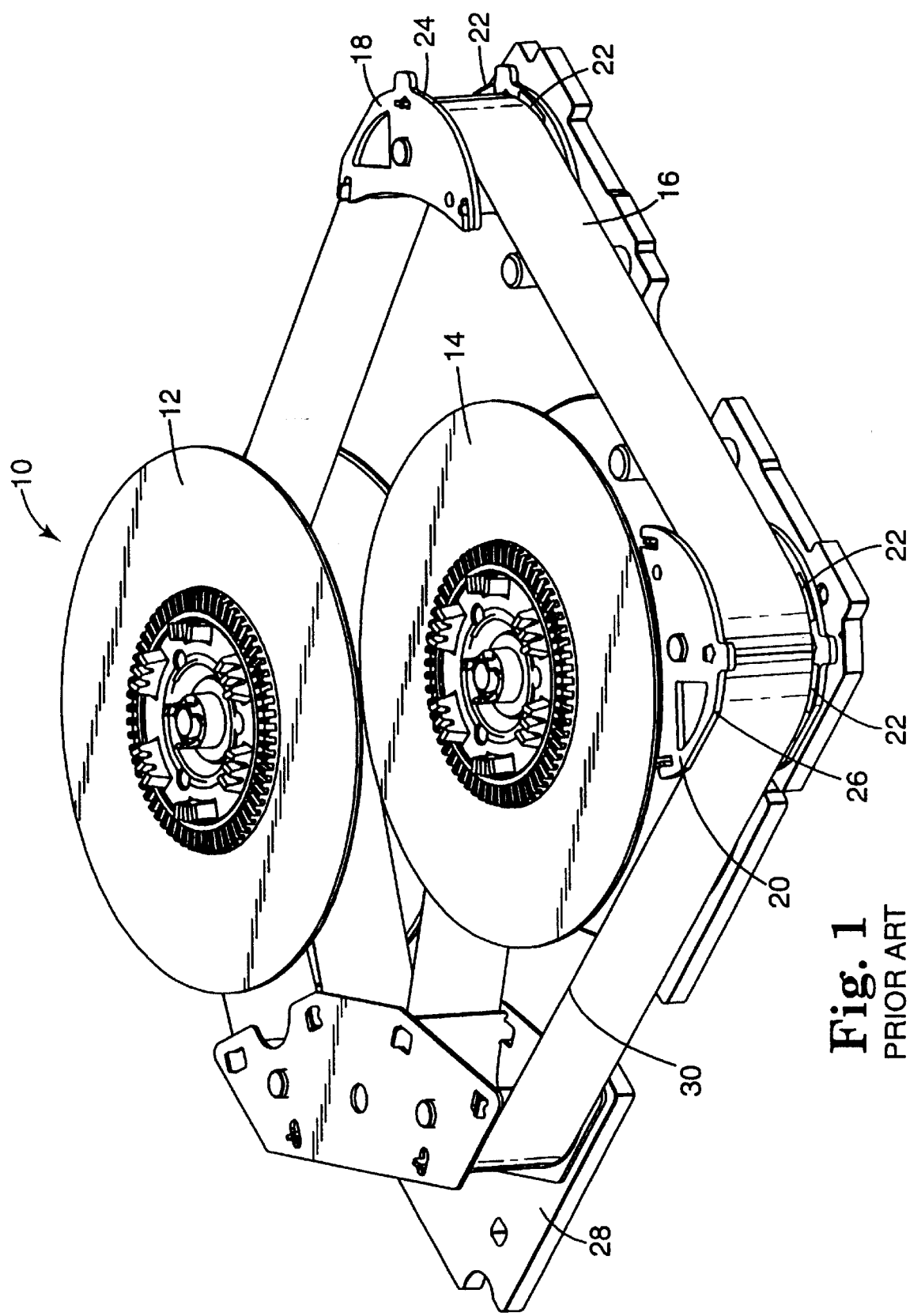
FIG. 1 is a perspective diagram of a prior art dual reel data cartridge incorporating a compliant front guide assembly.
Figure 2:
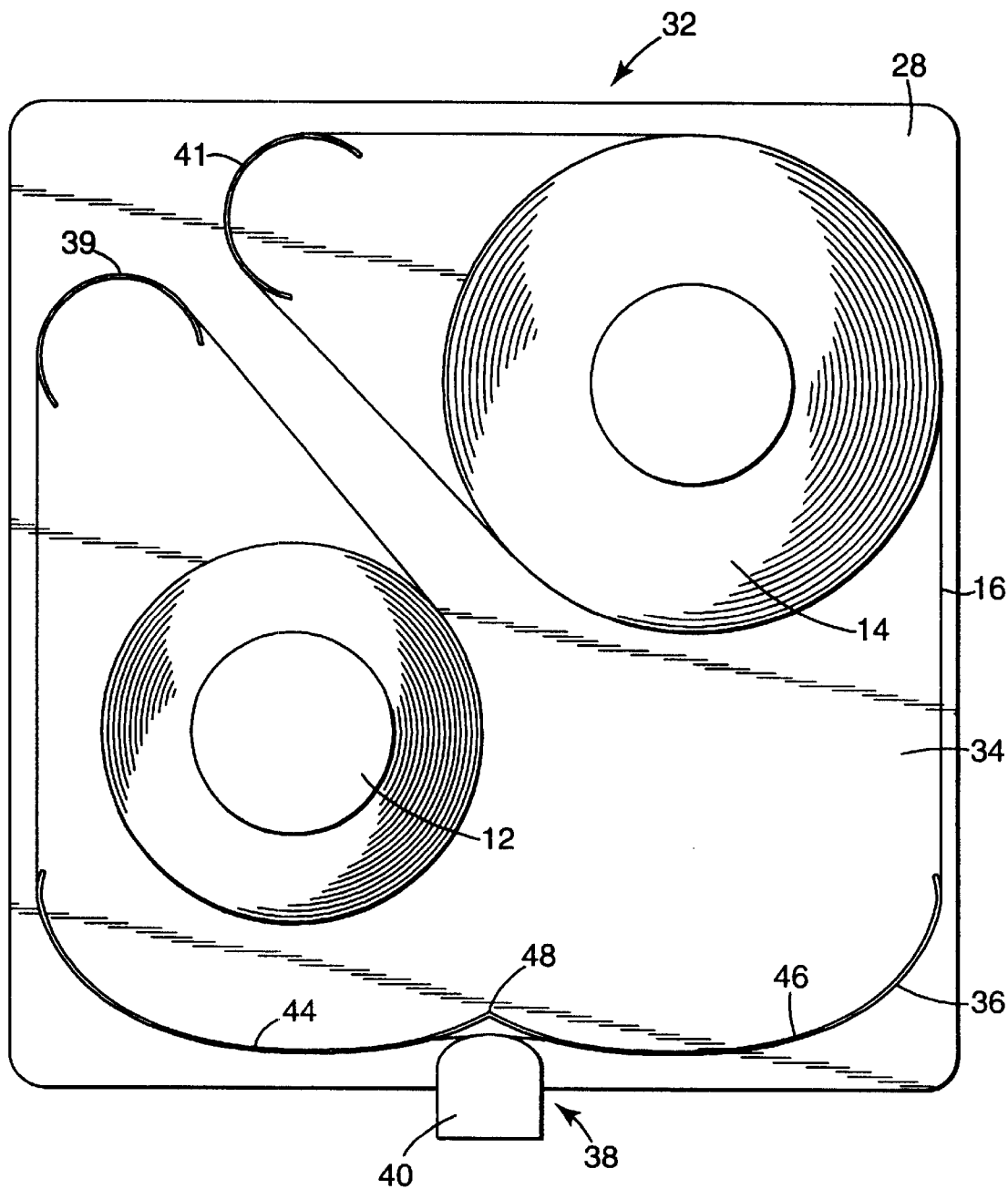
FIG. 2 is a perspective diagram of a dual reel data cartridge incorporating the tape guide of the present invention.

Referring to FIG. 2 of the drawings, a tape cartridge indicated generally at 32 is provided for carrying data. Like the prior art cartridge shown in FIG. 1, cartridge 32 defines an enclosure in which a pair of reels 12 and 14 are supported for free rotation about spaced and substantially parallel axis. A length of magnetic tape 16 is moved along a tape path established by suitable guides as explained below. The opposite ends of tape 16 are connected to reels 12 and 14.

The cartridge shown in FIG. 2 is a dual reel cartridge, also called a "hub-driven" cartridge. While dual reel cartridge 32 is shown for exemplary purposes, it is understood that the tape guide of the present invention may be used in any suitable data cartridge including, without limitation, single reel cartridges and belt driven cartridges, as well as equipment such as drives, servo writers, etc., where it is desired to provide improved tape guidance. Cartridge 32 includes a base plate 28 made of aluminum or other suitable material, and a cover 34 made of a clear or translucent polymer or other suitable material to form the tape cartridge enclosure. Cover 34 is removably fastenable to base plate 32 with conventional snap fasteners not shown. Screw bosses, also not shown, may be provided as needed for attachment of parts to the base plate 32 and/or cover 34.

A path for the magnetic tape 16 is defined with respect to the reels 12 and 14 by the use of an elongated tape guide 36. The guide 36 positions the tape properly in the region (read/write area 38) where the tape is engaged with a transducer or read/write head 40.

Figure 3:
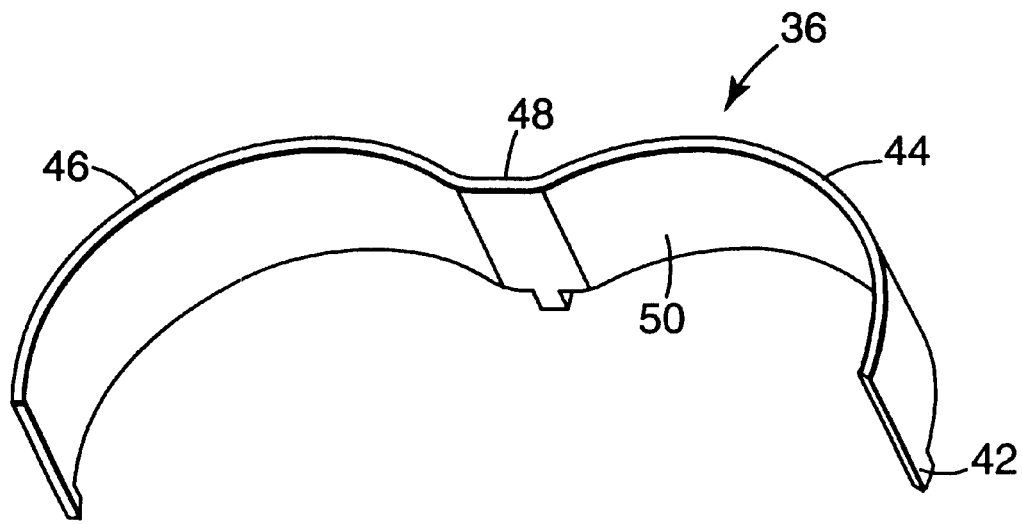
FIG. 3 is a rear perspective diagram of the tape guide of FIG. 2.

Base plate 28 is a relatively rigid plate, generally made of aluminum or other suitable material to provide support. Elongated tape guide 36 is held in place by any select one of a number of known fasteners. For example, as shown in FIG. 3, integral mounting pegs 42 may be mounted in apertures in the base plate 28 and securely held in place in the base plate at the desired locations. Alternatively, tape guide 36 may be mounted to base plate 28 by any suitable method such as, for example, ultrasonic welding, resistance welding, staking, etc.

Tape 16 is guided by elongated tape guide 36 along a substantial portion of its path of movement between reels 12 and 14, and the guide extends along the edge of the tape cartridge where the transducer is located. The elongated tape guide 36 is formed to have curved guide end portions 44 and 46 and a formed center portion 48 so that it will clear the necessary components of the cartridge and tape recorder and provide the desired tape path across the read/write head or transducer 40.

As shown in FIG. 3, tape guide 36 has an upright guide wall 50 having a surface generally perpendicular to the base plate 28 when installed. Tape guide 36 may, in a preferred embodiment, include upper and lower formed flanges 52 and 54 defining respective reference support shoulders 56 and 58 to position the upper and lower edges of tape 16.

Tape guide 36 preferably has a flange to flange clearance slightly larger than the width of tape 16 in which this clearance is disposed along the tape. This is known as a clearance guide, in contrast to a compliant guide. To achieve the desired line contact and guiding benefits, guide wall 50 of tape guide 36 has a surface which slidably engages tape 16 in the direction of tape travel along a length L1 of the surface. As shown in FIG. 2, tape 16 then travels freely to either of tape reels 12 or 14. The tape path may include idler bearings 39 or 41 between tape guide 36 and tape reels 12 or 14, but these idler bearings serve only to define the tape path. They do not provide any vertical guiding of the tape (unlike guide 36). The shortest of either of these tape paths is defined as L2. In order for the tape guide 36 to provide improved tape guiding, the distance L1 should be equal to or greater than at least 30% of the length of the tape path L2 from the tape guide to the tape reel, i.e., $L1 \geq 0.3\ L2$. More preferably, this ratio should be at least $L1 \geq 0.5\ L2$, and still more preferably, $L1 \geq 0.7\ L2$. In certain circumstances, this ratio should be $L1 \geq L2$, provided that the geometry of the tape path allows for such a ratio.

In any case, the presence of idler bearings 39 and 41 or other pins, etc., in the tape path do not change the fact that the distance defining L2 is the distance from the tape guide to the tape reel, along the tape path, since such idler bearings or other pins, etc., do not serve to guide the tape vertically.

For example, presently a 9840-type data storage cartridge has a distance L2 from tape guide to tape reel of about 7 inches (180 mm), including intermediate non-vertical tape steering surfaces. Presently, the length L1 of the guiding surface of the tape guide is equal to about 0.5 inches (13 mm), and thus L1=0.07 L2. In contrast, a 9840 cartridge having a tape guide according to the present invention should be defined by the equation L1≧0.3 L2. Keeping L2 constant at 180 mm, L1 should be at least 54 mm long (30% of 180 mm). Given the practical considerations of the 9840 tape path, a preferred length for L1 may be about 4 inches (100 mm), so that L1=0.55 L2.

As another example, a TRAVAN belt-driven data storage cartridge has a length L2 from the tape guide to the tape of about ¾ inch (19 mm). (TRAVAN is a trademark of Ination Corp.) Presently, the length L1 of the guiding surface is 0.17 inches (4 mm) and thus L1=0.23 L2. In contrast, a TRAVAN cartridge having a tape guide according to the present invention should be defined by the equation L1≧0.3 L2. Keeping L2 constant at 19 mm, L1 should be at least 6 mm long (30% of 19 mm). Given the practical considerations of the tape path, a preferred length for L2 may be about 19 mm, so that L1=L2.

Figure 4:
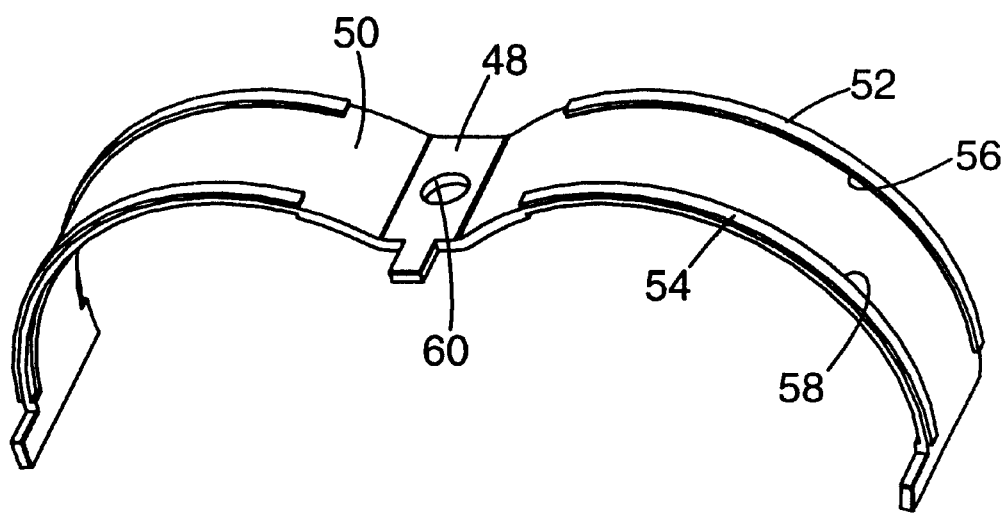
FIG. 4 is a front perspective view of the tape guide of the present invention.

Elongated tape guide 36 is formed with recessed portion 48 to permit the tape 16 to be spaced from the guide 36 in the area where the transducer 40 engages the tape 16. This allows tape 16 to deflect to ensure that there is adequate tape tension as tape 16 passes the transducer 40. As shown in FIG. 4, the tape guide wall 50 may also be provided with an aperture 60 for permitting transmission of optical signals that are used to sense the approach of the end of the tape 16.

Tape guide 36 may be made from any suitable material including, without limitation, plastic, ceramic, metal or any combination thereof, in any suitable manner including extrusion, shearing, forming, etc. In a preferred embodiment, however, tape guide 36 is made of aluminum and is formed by bending a flat sheet of material in a half shearing process. The above shearing process is advantageous as it results in a tape guide having small grains and thus a substantially smoother surface than that normally obtained from extruded metals which typically have large grains and rough surfaces.

Figure 5:
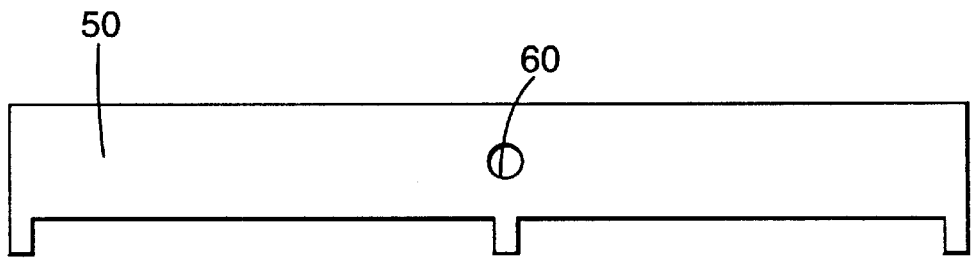
FIG. 5 is a front view of the tape guide of the present invention in a flat form before shearing and forming.
Figure 6:
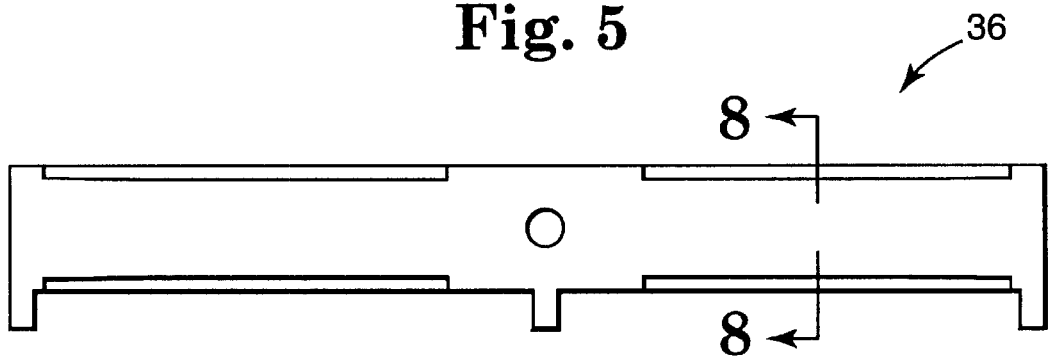
FIG. 6 is a front view of the tape guide of the present invention in a flat form after shearing and before forming.
Figure 7:
FIG. 7 is a rear view of the tape guide of FIG. 6.
Figure 8:
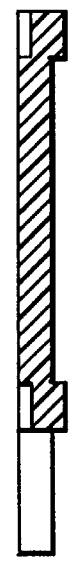
FIG. 8 is a cross-sectional elevational view of the tape guide of FIG. 6.

FIG. 5 shows one embodiment of tape guide 36 as a flat sheet before a half-shearing and forming process. FIGS. 6–8 provide a top view, a rear view, and a cross-sectional view of tape guide 36 after half shearing and before forming.

Figure 9:
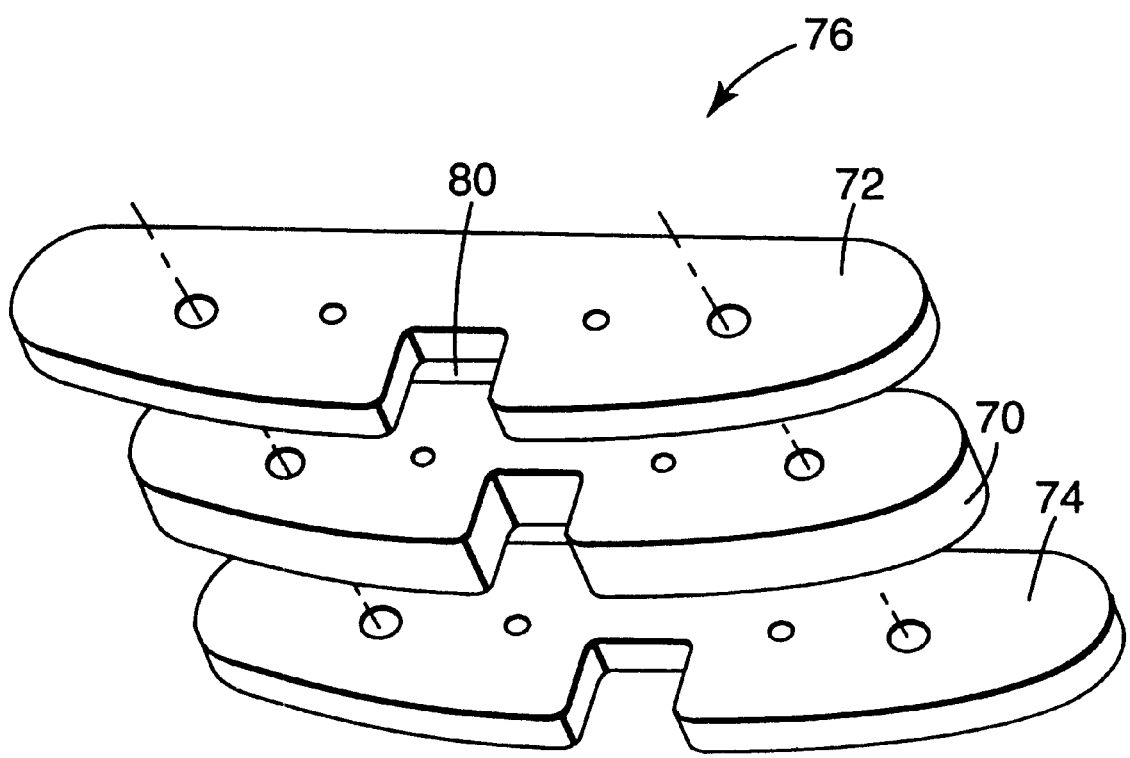
FIG. 9 is an exploded perspective view of an alternative embodiment of a tape guide according to the present invention.

As shown in FIG. 9, tape guide 76 may comprise a multi-piece component wherein a top flange 72, a bottom flange 74, and a bearing surface 70 are each separate pieces. Top and bottom flanges 72 and 74 are wider than bearing surface 70 to define support shoulders to position the upper and lower edges of tape 16. Aperture 80 allows for insertion of a drive head or transducer. Tape guide 76 would be more likely to be used in a general tape transport such as a servo writer as opposed to a tape cartridge.

In keeping with the invention, tape guides 36 and 76 have lengths that are longer, and preferably substantially longer, than the tape 16 is wide. As a result, as the tape 16 now makes an excursion as a result of a TMR, a hub misalignment, etc., it cannot simply reflect through a fixed point. It must now reflect across the entire length of guide 36 or 76. That is, instead of reflecting from a point contact to a point contact, it must reflect from a point contact to a line contact thereby substantially slowing transverse motions and providing greater guidance thus reducing, if not eliminating servo off track events.

What is claimed is:

1. A tape path, comprising:
    a length of data storage tape having data tracks;
    at least one tape reel; and
    a clearance-type tape guide for guiding the tape past a drive transducer;
    wherein the tape guide has a vertical guide wall having a surface for slidably engaging the tape, the surface having a length L1 along the tape path, wherein the tape path has a length L2 between the tape guide and the at least one tape reel, wherein L1≧0.3 L2, whereby the drive transducer reads/writes data on the data tracks of the data storage tape.

2. The tape path of claim 1, wherein L1≧0.5 L2.

3. The tape path of claim 1, wherein L1≧0.7 L2.

4. The tape path of claim 1, wherein L1≧L2.

5. The tape path of claim 1, wherein the guide further comprises a central portion configured to receive a drive transducer.

6. The tape path of claim 5, wherein the guide is formed by bending a single flat sheet of material.

7. The tape path of claim 5, wherein the guide is a multi-piece guide.

8. A data storage cartridge, comprising:
    a cartridge housing having an opening for receiving a read/write head;
    a pair of tape reels rotatably mounted in the housing;
    a length of data storage tape having data tracks wound on the reels such that a portion of the tape extends from one reel to the other along a tape path;
    a clearance-type tape guide for guiding the tape past a drive transducer along the tape path, wherein the tape guide has a vertical guide wall having a surface for slidably engaging the tape, the surface having a length L1 along the tape path, wherein the tape path has a length L2 between the tape guide and the nearset tape reel, wherein L1≧0.3 L2, whereby the drive transducer reads/writes data on the data tracks of the tape.

9. The cartridge of claim 8, wherein L1≧0.5 L2.

10. The cartridge of claim 8, wherein L1≧0.7 L2.

11. The cartridge of claim 8, wherein L1≧L2.

12. The cartridge of claim 8, wherein the guide further comprises a central portion configured to receive a drive transducer.

13. The cartridge of claim 12, wherein the guide is formed by bending a single flat sheet of material.

14. The cartridge of claim 12, wherein the guide is a multi-piece tape guide.

15. The cartridge of claim 8, wherein the data storage tape is magnetic data storage tape.

16. The cartridge of claim 15, wherein the data storage tape has at least 100 linear data tracks.

* * * * *

UNITED STATES PATENT AND TRADEMARK OFFICE
CERTIFICATE OF CORRECTION

PATENT NO.   : 6,343,757 B1
DATED        : February 5, 2002
INVENTOR(S)  : Christopher J. Zwettler It is certified that error appears in the above-identified patent and that said Letters Patent is hereby corrected as shown below:

Column 6,
Line 45, "nearset" should read -- nearest --.

Signed and Sealed this

Twenty-first Day of January, 2003

JAMES E. ROGAN
*Director of the United States Patent and Trademark Office*